United States Patent [19]

Lewis et al.

[11] Patent Number: 5,665,847
[45] Date of Patent: Sep. 9, 1997

[54] PRODUCTION OF NITROSAMINE-FREE SILICONE ARTICLES

[75] Inventors: Larry Neil Lewis, Scotia; Edward Matthew Jeram, Burnt Hills, both of N.Y.

[73] Assignee: General Electric Company, Waterford, N.Y.

[21] Appl. No.: 594,508

[22] Filed: Jan. 31, 1996

Related U.S. Application Data

[63] Continuation of Ser. No. 298,981, Aug. 31, 1994, abandoned.

[51] Int. Cl.$^6$ .......................... C08G 77/06; C08G 77/12
[52] U.S. Cl. ................................ 528/15; 528/31
[58] Field of Search ........................... 528/15, 31

[56] References Cited

U.S. PATENT DOCUMENTS

| | | |
|---|---|---|
| 3,197,433 | 7/1965 | Lamoreau . |
| 3,220,972 | 11/1965 | Lamoreaux . |
| 3,445,420 | 5/1969 | Kookootsedes et al. . |
| 3,635,743 | 1/1972 | Smith . |
| 3,715,334 | 2/1973 | Karstedt . |
| 3,814,730 | 6/1974 | Karstedt . |
| 3,847,848 | 11/1974 | Beers . |
| 3,884,866 | 5/1975 | Jeram et al. . |
| 3,917,432 | 11/1975 | Feuerstein et al. . |
| 3,989,667 | 11/1976 | Lee et al. . |
| 4,162,243 | 7/1979 | Lee et al. . |
| 4,288,345 | 9/1981 | Ashby et al. . |
| 4,340,709 | 7/1982 | Jeram et al. . |
| 4,382,057 | 5/1983 | Tolentino . |
| 4,427,801 | 1/1984 | Sweet . |
| 4,529,774 | 7/1985 | Evans et al. . |
| 5,082,886 | 1/1992 | Jeram et al. . |
| 5,087,671 | 2/1992 | Loeppky et al. . |
| 5,244,582 | 9/1993 | Loeppky et al. . |
| 5,331,075 | 7/1994 | Sumpter et al. . |

FOREIGN PATENT DOCUMENTS 2 295 827  6/1996  United Kingdom .

OTHER PUBLICATIONS

Estimation of Volatile N–Nitrosamines In Rubber Nipples For Babies' Bottles Food Cosmet. Toxicol., vol. 20 pp. 939 to 944 (1982) D.C. Havery and T. Fazio.
N–Nitrosamines in Baby Bottle Rubber Nipples Gas Chromatographic Method AOAC Official Methods of Analysis (1990).
Reducing Nitrosamines During Vulcanization Rubber & Plastics News (Mar. 28, 1994) Dwight W. Chasar.
Gas Chromatographic–Thermal Energy Analysis Method for Determination of Volatile N–Nitrosamines in Baby Bottle Rubber Niples: Collaborative Study, by Gray & Stachiw, J. Assoc. Off. Anal. Chem. (1987) 70, March Issue.

*Primary Examiner*—Helen Lee
*Attorney, Agent, or Firm*—Kenneth S. Wheelock

[57] ABSTRACT

The present invention relates to a method for making nitrosamine-free silicone articles by post baking in an inert atmosphere.

7 Claims, No Drawings

PRODUCTION OF NITROSAMINE-FREE SILICONE ARTICLES

This is a continuation of application Ser. No. 08/298,981 filed on Aug. 31, 1994, now abandoned.

The present invention relates to production of nitrosamine-free silicone articles. More particularly, it is concerned with production of nitrosamine-free silicone articles by means of post baking in an atmosphere substantially oxygen free.

BACKGROUND OF THE INVENTION

Several reports have been published describing the presence of volatile N-nitrosamines in various rubber products. The present concern about the occurrence of volatile N-nitrosamines in baby bottle rubber nipples and the possible migration of these compounds into infant formula was prompted by a report of Preussmann et al., (1981) Am. Chem. Soc. Symp. Ser. 174, American Chemical Society, Washington, DC, p. 217.

A method was described for the estimation of volatile N-nitrosamines in the rubber nipples of babies bottles. In study of rubber nipples from one manufacturer, N-nitrosopiperidine were determined by gas chromatography, using a thermal energy analyser, and their presence was confirmed by mass spectrometry with average levels of individual nitrosamines ranging from 22 to 281 ppb. When the nipples were sterilized in a conventional sterilizer together with milk or infant formula the three nitrosamines migrated into the milk or formula. Storing a bottle of milk with a rubber nipple invertied in it for 2 hr at room temperature or overnight in a refrigerator after sterilization resulted in an 8–13% average increase in the nitrosamine levels migrating into the milk. On repeated sterilization of a single nipple, the quantities of nitrosamines migrating into milk from rubber nipples declined steadily, but after seven sterilizations, nitrosamines were still readily detectable in the milk. Nitrosamine levels were higher in rubber nipples after sterilization, indicating the presence of nitrosamine precursors in the nipples. No nitrosamines were found in raw, uncured rubber. Chemical accelerators and stabilizers added during the vulcanization process are the source of the amine precursors in rubber nipples.

On Jan. 1, 1984, the U.S. Food and Drug Administration (hereinafter "FDA") established an action level of 60 ppb total N-nitrosamines in rubber nipples. The action level was reduced to 10 ppb on Jan. 1, 1985.

A collaborative study was conducted on the FDA dichloromethane extraction method for determining volatile N-nitrosamines in baby bottle rubber nipples. Following dichloromethane extraction, N-nitrosamines were determined by gas chromatography-thermal energy analysis. Six pairs of blind duplicate rubber nipple samples representing 6 lots were analyzed by 11 collaborating laboratories. All samples were portions taken from equilibrated composites of cut-up rubber nipples obtained from manufacturers in the United States. Recoveries of the internal standard (N-nitrosodipropylamine) at approximately 20 ppb ranged from 10 to 120%. Reproducibility relative standard deviations (RSD) were between 35 and 45% for N-nitrosamine levels from 10 to 20 ppb. However, when data from laboratories with recoveries less than 75% were excluded (this is now specified in the method), RSD, values were between 11 and 32% for N-nitrosamine levels from 6 to 26 ppb. Values were consistent with or better than those reported for other analytical techniques designed to quantitate trace contaminants at the low ppb level, e.g., aflatoxin in food. The method has been adopted official first action for the quantitation of volatile N-nitrosamines in baby bottle rubber nipples. See Gas Chromatographic-Thermal Energy Analysis Method for Determination of Volatile N-Nitrosamines in Baby Bottle Rubber Nipples: Collaborative Study, by Gray & Stachiw, J. Assoc. Off. Anal. Chem. (1987) 70, March Issue.

Although research in the rubber industry has been devoted to lowering or eliminating nitrosamines, none of these studies have included silicone rubber materials. Silicone elastomeric compositions, in contrast to synthetic rubber compounds, are usually prepared from a vinyl-containing polydiorganosiloxane, an organohydrogensilicone crosslinker, and a platinum catalyst. The compositions of this type are desirable for many reasons. For instance, they cure without by-products. They can cure at room temperature or at elevated temperatures. They can be stabilized for storage at room temperature by utilization of a platinum catalyst inhibitor. And, they can be made from high and low viscosity polymers. These compositions utilize components that are low enough in viscosity that they are easily pumpable or extrudable as well as have a fast cure time. These compositions also provide cured silicone elastomers which are characterized by high strength and high durometer.

Cross-linked silicone polymers with their particularly low intermolecular interactions have low tensile strengths. Only with the addition of reinforcing fillers can high-strength silicone polymers be obtained. Particularly suitable are fumed silicas with BET surface areas of 150 to 400 $m^2/g$ which increase the tensile strength about 20 fold to 10–12 MPa. At the same time, viscosity is considerably increased because fumed silicas have a strong thickening effect. This effect is caused by formation of agglomerates of the primary silica particles. These agglomerates build a three-dimensional network (tertiary structure) via hydrogen bonds so that the bulk density of the fumed silica is only about 50 g/l. To produce a mixture of 40 parts silica, in 100 parts polymer therefore requires addition of 8 volume parts of filler for 1 volume part of polymer. These ratios clearly indicate the necessity of using treating agents which reduce interactions between filler agglomerates as much as possible. The most effective and most commonly used treating agents is hexamethyldisilazane (hereinafter "HMDZ"). The fillers treated with HMDZ have a considerably reduced thickening effect and therefore are particularly suitable for the use in liquid silicone rubbers.

Since silicone elastomer are entirely different polymers, these silicones became leading candidates to replace the synthetic rubber compounds. Analysis of the cured silicone elastomers showed no presence of nitrosamines. However, to applicants' surprise, upon post-baking as required by FDA, the presence of nitrosamines was detected. For silicones to serve these FDA regulated markets, a method of removing the nitrosamines must be found.

SUMMARY OF THE INVENTION

There is provided by the present invention a method for making nitrosamine-free silicone articles which comprises mixing (A) vinyl-containing organopolysiloxane; (B) silicon hydride siloxane; (C) filler and (D) a catalytic amount of a platinum group metal compound or a peroxide, and post baking the mixture in an inert atmosphere.

The critical feature that led to this invention is based on the discovery that if the post baking is carried out in an atmosphere substantially oxygen free, the resultant part is substantially free of nitrosamine.

DETAILED DESCRIPTION OF THE INVENTION

Component (A), the vinyl-containing organopolysiloxanes, generally has a viscosity of from 5,000 to 1,000,000 centipoise at 25° C. The preferred vinyl-containing organopolysiloxanes are be vinyl-stopped polymer having the general formula $M^{Vi}D_xM^{Vi}$, vinyl-on-chain copolymers such as $MD^{Vi}{}_xD_yM$, vinyl-stopped, vinyl-on-chain copolymers such as $M^{Vi}D_xD^{Vi}{}_yM^{Vi}$, vilyl and trimethylsilyl-stopped copolymers such as $MD_xM^{Vi}$, or a mixture thereof, wherein Vi represents a vinyl radical, M represents a trimethylsiloxy radical, $M^{Vi}$ represents dimethylvinylsiloxy, D is dimethylsiloxy. Such polymers are taught by U.S. Pat. Nos 5,082,886, 4,340,709, 3,884,866 issued to Jeram et al., U.S. Pat. No. 5,331,075 issued to Sumpter et al., U.S. Pat. No. 4,162,243 issued to Lee et al., U.S. Pat. No. 4,382,057 issued to Tolentino, and U.S. Pat. No. 4,427,801 issued to Sweet, hereby incorporated by reference.

Component (B), the silicon hydride siloxane or silicon hydride siloxane fluid used in the invention can have about 0.04 to about 1.4% by weight of chemically combined hydrogen attached to silicon. One form of the silicon hydride siloxane is a "coupler" having the formula,

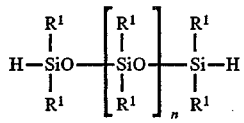

where $R^1$ is selected from $C_{1-13}$ monovalent hydrocarbon radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride siloxane fluid.

In addition fo the silicone hydride coupler of formula (1), the silicon hydride siloxane fluid used in the heat curable organopolysiloxane compositions of the present invention also can include silicon hydride resins consisting essentially of the following chemically combined units,

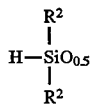

chemically combined with $SiO_2$ units, where the $R^2+H$ to Si ratio can vary from 1.0 to 2.7. Silicon hydride resin also can have units of the formula,

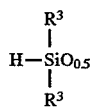

chemically combined with $SiO_2$ units and $(R^4)_2SiO$ units, where the $R^3+R^4+H$ to Si ratio can vary from 1.2 to 2.7, where $R^2$, $R^3$ and $R^4$ are $C_{1-13}$ monovalent hydrocarbon radicals free of olefinic unsaturation selected from $R^1$ radicals.

The silicon hydride siloxane fluid also can include linear hydrogen containing polysiloxane having the formula,

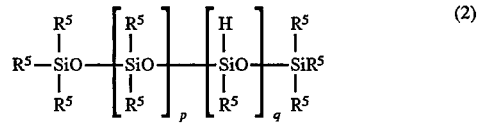

where $R^5$ is a $C_{1-13}$ monovalent hydrocarbon radical free of olefinic unsaturation, selected from $R^1$ radicals, and p and q are integers having values sufficient to provide a polymer having a viscosity of from 1 to 1,000 centipoises at 25° C.

In formulas (1) and (2) and the chemically combined units described above, $R^1$, $R^2$, $R^3$, $R^4$ and $R^5$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifuloropropyl.

Component (C), the filler is any reinforcing or extending filler known in the prior art. In order to get the high tensile strength, for example, a reinforcing filler is incorporated. Illustrative of the many reinforcing fillers which can be employed are titanium dioxide, lithopone, zinc oxide, zirconium silicate, silica aerogel, iron oxide, diatomaceous earth, calcium carbonate, fumed silica, silazane treated silica, precipitated silica, glass fibers, magnesium oxide, chromic oxide, zirconium oxide, aluminum oxide, alpha quartz, calcined clay, asbestos, carbon, graphite, cork, cotton, synthetic fibers, etc.

Preferably, the filler is either a fumed or precipitated silica that has been treated. The treating process may be done in accordance with the teachings of U.S. Pat. No. 4,529,774 issued to Evans et al., U.S. Pat. No. 3,635,743 issued to Smith, U.S. Pat. No. 3,847,848 issued to Beers; hereby incorporated by reference, Alternatively, and most preferably, the filler is treated in-situ; that is the untreated silica filler and the treating agents are added to the silicone elastomer composition separately, and the treatment process is accomplished simultaneously with the mixture of the filler into the elastomer. This in-situ process is taught by Evans in U.S. Pat. No. 4,529,774; hereby incorporated by reference.

Alternatively, the fillers can be replaced by the vinyl treated silica filler of U.S. Pat. No. 4,162,243 issued to Lee et al.; and U.S. Pat. No. 4,427,801 issued to Sweet; hereby incorporated by reference.

Component (D), the catalyst, is any compound that promotes the hydrosilation reaction between a silicon hydride and an ethylenically unsaturated polyorganosiloxane. Typically, it is a precious metal compound; usually platinum. Such catalysts are well known in the art. Preferred catalysts are taught by in U.S. Pat. Nos. 3,917,432, 3,197, 433 and 3,220,972 issued to Lamoreaux, U.S. Pat. Nos. 3,715,334 and 3,814,730 issued to Karstedt, and U.S. Pat. No. 4,288,345 issued to Ashby et al., hereby incorporated by reference.

Alternatively, the catalyst can be a peroxide or it can be a combination of peroxides comprising a low temperature peroxide and a high temperature peroxide.

Since mixtures containing Components A, B, and C with the catalyst, Component D, may begin to cure immediately on mixing at room temperature, it may be desirable to inhibit the action of the catalyst at room temperature with a suitable inhibitor if the composition is to be stored before molding. Platinum catalyst inhibitors are used to retard the catalytic activity of the platinum at room temperature, but allow the platinum to catalyze the reaction between Components A, B and C at elevated temperature.

One suitable type of platinum catalyst inhibitor is described in U.S. Pat. No. 3,445,420 issued to Kookootsedes et al. which is hereby incorporated by reference to show certain acetylenic inhibitors and their use. A preferred class of acetylenic inhibitors are the acetylenic alcohols, especially 2-methyl-3-butyn-2-ol.

A second type of platinum catalyst inhibitor is described in U.S. Pat. No. 3,989,667 issued to Lee et al. which is hereby incorporated by reference to show certain olefinic siloxanes, their preparation and their use as platinum catalyst inhibitors.

A third type of platinum catalyst inhibitor is a polymethylvinylcyclosiloxane having three to six methylvinylsiloxane units per molecule.

The optimum concentration of platinum catalyst inhibitor is that which will provide the desired storage stability at ambient temperature without excessively prolonging the time interval required to cure the compositions at elevated temperatures. This amount will vary widely and will depend upon the particular inhibitor that is used, the nature and concentration of platinum-containing catalyst and the nature of the organohydrogensiloxane.

Compositions of the present invention can be used in a liquid injection molding process in which the composition is injected into light weight molds under low pressures, such as 600 kPa cylinder pressure. Such compositions can be cured very rapidly in a hot mold and removed without cooling the mold. The type of molding, extruding or curing process used is not narrowly critical and can include those known in the art. An advantage of the compositions of this inventions is the extrudability which makes it adaptable to molding processes such as liquid injection molding at low pressures. The prepared compositions have a viscosity such that at least 45 grams per minute can be extruded through a 3.175 millimeter orifice under a pressure of 620 kilopascals. Preferably, the viscosity is such that at least 50 grams per minute can be extruded.

The silicone elastomeric compositions can readily be prepared in conventional mixing equipment because of its fluid nature. The order of mixing is not critical if the composition is to be used immediately. However, it is preferable to combine (A), (C) and (D) and thereafter add (B). This permits the small amount of (D) to become well dispersed in (A) and (C) prior to the beginning of any curing reaction. Suitable two package composition can be made using such as technique. For example, a convenient two package composition can be prepared by mixing part of (A), part of (C) and all of (D) in one package and the remainder of (A) and (C) and all of (B) in a second package such that equal amounts of package one and package two can be mixed to produce the compositions of this invention. Single package compositions can be prepared by mixing (A),(B), (C), (D), and a platinum catalyst inhibitor. These inhibited compositions can be stored for extended periods of time without curing, but the compositions will still cure when heated above 70° C., preferably when heated above 100° C. to shorten the cure time.

The cured silicone elastomers obtained from the compositions are then post baked in an atmosphere substantially oxygen free. What is meant by substantially oxygen free is that the atmosphere is generally less than 15% oxygen and preferably less than 10%. In one embodiment, the cured silicone elastomers are post baked in an inert atmosphere comprises He, $N_2$, argon, $CO_2$, $CH_4$ and a mixture thereof. Alternatively, the cured silicone elastomers are post baked in a vacuum system. The cured silicone elastomers are post baked at temperatures from 300° to 450° F. for 0.3 to 5 hours, preferably 325° to 425° F. for 0.5 to 4 hours, and most preferably at 400° F. for 1 hour.

In order to demonstrate various features of this invention, the following examples are submitted. They are for illustrative purposes and are not intended to limit in any way the scope of this invention.

EXAMPLE 1 Test Specimen Preparation

A silicone LIM base compound was prepared according to the teachings of this invention using the formulation of Table I.

TABLE I 64.5 pts 40,000 cps vinyl chainstopped polydimethylsiloxane polymer
25 pts 325 $m^2$/gm octamethylcyclotetrasiloxane treated fumed silica
1 pt vinyltriethoxysiloxane
6 pts hexamethyldisilazane
6 pts water
4 pts 500 cps vinyl chainstopped, polydimethyl, methylvinyl copolymer
4 pts 500 cps trimethylsilyl and dimethylvinyl chainstopped polydimethylsiloxane polymer
2.5 pts MQ resin The 40,000 cps vinyl chainstopped polymer, water and hexamethyldisfiazane were mixed together in a cooled mixer. The 325 $m^2$/gm $D_4$ treated filler was added slowly into the mixture and mixed until it was completely incorporated. The vinyltriethoxysfiane was added into the mixture and mixed well. The mixer was sealed and heated for one hour at 70°–80° C. The batch was stripped at 140° C. under full vacuum to remove all the filler treating reaction by products. The mixture was 80° C. and added the two 500 cps vinyl containing copolymers and mixed well. 2.5 parts of the MQ resin release agent was added. Pulled vacuum to deair the batch.

Component A was prepared by adding sufficient amount of Karstedt platinum organosiloxane complex to obtain 20–40 ppm Pt as platinum. Component B was prepared by adding approximately 330 ppm H of hydride crosslinker ($M^H D_x D_y^H M^H$) and approximately 0.4 parts methyl butynol, mixed until well dispersed. A LIM composition was prepared by mixing 100 parts of component A with 100 parts of component B in a static mixer with no air being introduced. The A/B mixture was then molded 20 seconds at 375° F. into 3"×5"×0.070" sheets. The as molded sheet has less than 1.0 ppb DMNA.

EXAMPLE 2 Post Baking in Air

Sheet #1 was post baked for one hour @ 400° in an air circulating oven and cooled to room temperature. The sample was referred to as PBO. Sheet #2 was wrapped in aluminum foil and post baked under the same conditions. The sample was referred to as PBS. The results are shown below:

|  | Sheet #1<br>PBO<br>1 hr @ 400° F. | Sheet #2<br>PBS<br>1 hr @ 400° F. |
| --- | --- | --- |
| Standard Formulation (Control)<br>Post Baked in Air | 4.0 ppb DMNA | 42.8 ppb DMNA |

DMNA = dimethyl nitrosamine

The results clearly indicate that there was no nitrosamines in molded LIM compositions. The nitrosamine only occurred when post baked in air at 400° F. for an hour. The nitrosamines generated were volatilized when post baked open and trapped when post baked sealed.

EXAMPLE 3 Post Baking in Helium Atmosphere

Same components A and B were mixed as described in the above Example 2, except the post bake 1 hr @ 400° F. was performed in a Helium atmosphere oven.

|  | PBO<br>1 hr @ 400° F. | PBS<br>1 hr @ 400° F. |
| --- | --- | --- |
| Standard Formulation (Control)<br>Post Baked in He Environment | <1.0 ppb DMNA | 2.9 ppb DMNA* |

*The low 2.9 ppb DMNA is probably due to some air that may have been trapped in the sealed sample.

The results indicate that post baking in He essentially eliminates the DMNA.

EXAMPLE 4 Post Baking in Nitrogen Atmosphere

Same components A and B were mixed as described in the above Example 2, except the post bake 1 hr @ 400° F. was performed in a nitrogen atmosphere oven.

|  | PBO<br>1 hr @ 400° F. | PBS<br>1 hr @ 400° F. |
| --- | --- | --- |
| Standard Formulation (Control)<br>Post Baked in nitrogen Environment | <1 ppb DMNA | <1 ppb DMNA |

What is claimed is:

1. A method for making nitrosamine-free silicone articles comprising the following steps:
   (a) mixing (A) a vinyl-containing organopolysiloxane; (B) a silicone hydride siloxane; (C) a filler; (D) a catalytic amount of catalyst;
   (b) curing the mixture of said step (a); and
   (c) post-baking the cured mixture of said step (b) in an atmosphere selected from the group consisting of helium, nitrogen, argon, carbon dioxide, methane and mixtures thereof whereby said cured silicone articles have a nitrosamine content below 1 ppb.

2. The method of claim 1, wherein the cured mixture is post baked in a vacuum system.

3. The method of claim 1, wherein the mixture is post baked at temperatures from 300° to 450° F. from 0.3 to 5 hours.

4. The method of claim 3, wherein the mixture is post baked at temperatures from 325° to 425° F. for 0.5 to 4 hours.

5. The method of claim 4, wherein the mixture is post baked at 400° F. for one hour.

6. The method of claim 1, wherein the mixture is cured in a heated molded.

7. The method of claim 1, wherein said step (a) further comprising the step of adding an effective amount of an inhibitor.

* * * * *